May 15, 1962
J. J. CHYLE
3,035,153
METHOD OF ARC WELDING USING CARBON DIOXIDE AS A SHIELDING
MEDIUM AND A DEOXIDIZING METAL ADDITION
Original Filed Oct. 7, 1954
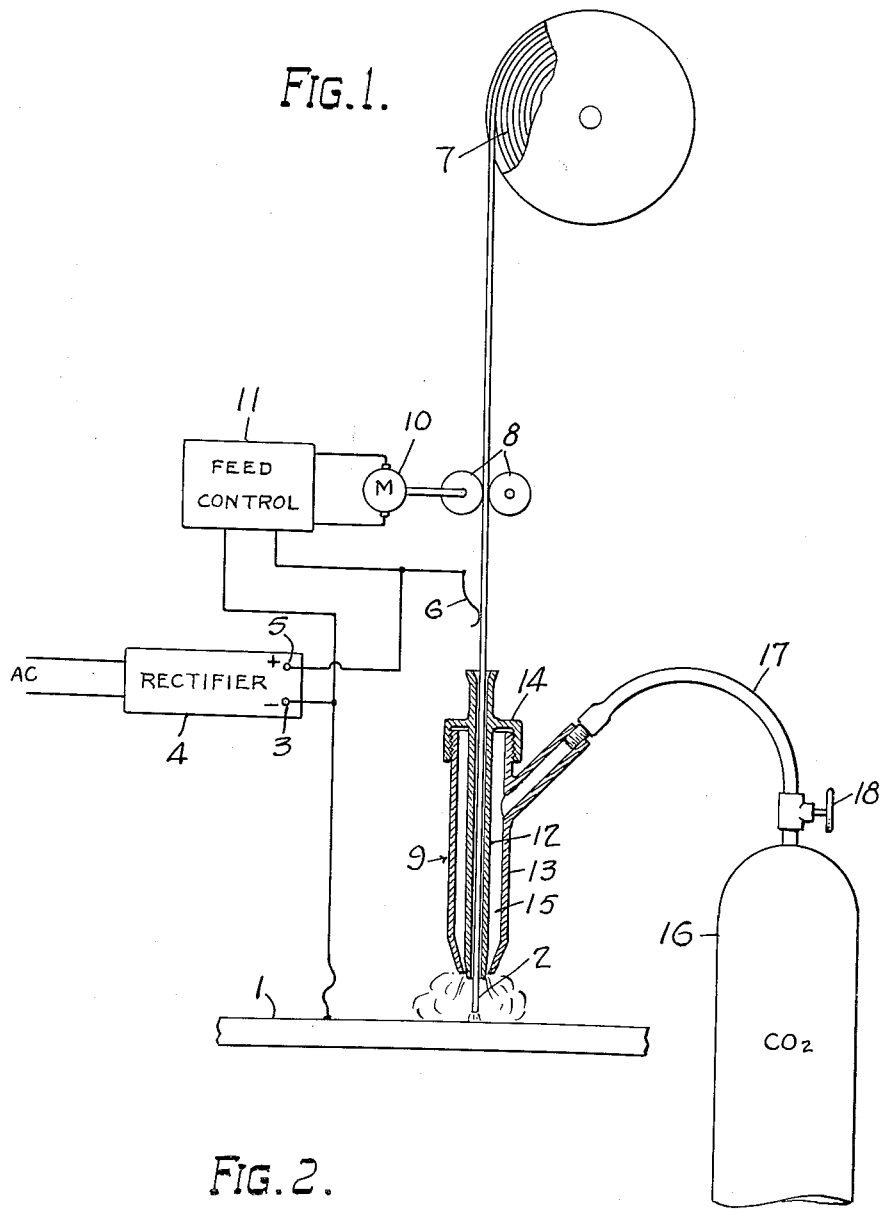
FIG.1.
FIG.2.
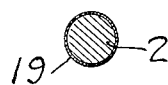
INVENTOR.
John J. Chyle
BY Andrus & Scales
ATTORNEYS.

United States Patent Office 3,035,153
Patented May 15, 1962

3,035,153
METHOD OF ARC WELDING USING CARBON DIOXIDE AS A SHIELDING MEDIUM AND A DEOXIDIZING METAL ADDITION
John J. Chyle, Wauwatosa, Wis., assignor to A. O. Smith Corporation, Milwaukee, Wis., a corporation of New York
Continuation of application Ser. No. 460,943, Oct. 7, 1954. This application Nov. 26, 1956, Ser. No. 624,467
2 Claims. (Cl. 219—74)

This invention relates to a method of arc welding and particularly to an arc welding method wherein the arc is maintained in an atmosphere of shielding gas.

This is a continuation application of application Serial No. 460,943 filed October 7, 1954, of the same inventor, now abandoned.

Arc welding in an atmosphere of a non-oxidizing gas with either a consumable electrode or a non-consumable electrode is known in the welding art. An inert gas such as helium, argon or a mixture of the two has been extensively employed. When a consumable electrode is employed, the work and electrode are generally connected with reverse polarity, i.e. the work is connected to the negative side of the welding current source and the electrode is connected to the positive side of the welding current source. The above arrangement permits an extremely rapid feed of the electrode toward the work. Although the above method of welding provides sound welds, helium and argon are relatively scarce and are expensive gases.

It has been suggested in the prior art to use a less costly gas such as carbon dioxide as a shielding medium, but attempts to employ carbon dioxide have not met with success. For example, the patent to Alexander No. 1,746,207 speaks of welding in an atmosphere of carbon dioxide and concludes that in every case the welds were brittle and not as good as welds made in air. Similarly the the paper "Studies on Electric Welding" by Ludwig J. Weber from the "Transactions of the American Society for Steel Treating" presented September 20, 1926, discloses that welds made in a carbon dioxide atmosphere are not satisfactory due to the oxidation of the iron.

The patents to Lincoln No. 1,589,017 and No. 1,711,151 disclose the use of an inert gas, such as carbon dioxide or nitrogen, with a low amperage, non-consumable carbon electrode system, but this method has never proven successful in commercial practice.

In some cases small amounts of carbon dioxide have been used in combination with other gases, such as argon, helium or carbon monoxide, to provide a gaseous shield that produced favorable results. In this combination of gases there is again the problem of using the relatively scarce and expensive gases argon and helium. The use of carbon dioxide alone is desirable because of the generally low cost and availability of carbon dioxide. However, the use of carbon dioxide alone as a shielding gas has never provided acceptable results.

The copending application of the applicant, Serial No. 460,944, filed October 7, 1954 and entitled, "Method of Arc Welding Using Carbon Dioxide as a Shielding Medium" is based on the discovery that sound welds can be produced with a shielding gas consisting solely of carbon dioxide when using a killed steel consumable electrode and by controlling the speed of the electrode feed and the current density within predetermined limits. The present invention goes a step beyond that invention and provides a further improvement in welding with a carbon dioxide gas shield by using a steel electrode having appreciable amounts of a deoxidizing metal combined therewith.

According to the invention the steel weld rod is coated or alloyed with a deoxidizing metal such as aluminum, silicon, titanium, magnesium, zirconium or manganese in an amount such that the deoxidizing metal comprises from 0.20% to 3.0% by weight of the total weight of the steel rod and the added metal. The steel electrode with the metal addition is fed toward the workpiece at a speed in the range of 200 to 600 inches per minute and the current density is maintained at a value of over 85,000 amperes per square inch.

With the high rate of electrode feed and the high current density combined with the deoxidizing metal additions to the electrode, it is possible to produce sound uniform welds.

The drawing furnished herewith illustrates the best mode presently contemplated for carrying out the invention.

FIGURE 1 is a schematic arrangement adapted for arc welding in accordance with the present invention; and FIG. 2 is an enlarged transverse section of the electrode.

Referring to the drawing, there is shown a workpiece 1 to be welded by striking an arc between the workpiece 1 and a consumable steel electrode 2 which may be in wire or rod shape. As shown in the drawing, reverse polarity arc welding is employed with the workpiece 1 connected to the negative terminal 3 of a source of direct current shown as a rectifier 4 and the electrode 2 connected to positive terminal 5 of the rectifier 4. The connection of the electrode 2 to the electric circuit is by a sliding contact 6 to allow movement of the consumable electrode. As the welding progresses, the portion of the electrode adjacent the workpiece is burned off and transferred to the workpiece 1.

To maintain a predetermined arc length between the electrode and the work, the electrode 2 is continuously drawn from a reel 7 by feed rollers 8 and fed through a welding head 9 toward the workpiece 1. The feed rollers 8 are variably driven by a motor 10 in accordance with the arc length as hereinafter described. The arc length is maintained practically constant by connecting the arc voltage as a voltage source to an electrode feed control 11 connected to the feed motor 10. If the arc voltage fluctuates, the feed control 11 varies the speed of the feed motor to return the arc length to normal. For example, if the arc length increases above normal, the arc voltage increases and this increased voltage is applied to the feed motor so as to increase the feed of the electrode 2 to the work. Conversely, a decrease in arc length and therefore arc voltage results in a reduction of the feed of electrode 3 and a lengthening of the arc length until a normal arc is obtained. This is a conventional variable electrode feed arrangement and the feed control 11 is therefore shown in diagrammatic form.

The welding head 9 is constructed with concentric cylinders 12 and 13 with the wire electrode 2 passing through the central cylinder 12. The top of the outer cylinder 13 is sealed to the inner cylinder 12 by a cap 14 welded to the outer surface of the cylinder 12 and is threaded onto the outer cylinder 13 to provide an annular passage 15 between the cylinders 12 and 13. To introduce carbon dioxide about the welding arc, a source 16 of carbon dioxide is connected to the passage 15 by a tube 17. A valve 18 in the tube 17 is employed to regulate the flow of gas to the passage 15. The carbon dioxide passes through passage 15 and is discharged concentrically of the electrode to envelop the arc and thereby protect the welding zone from the surrounding atmosphere.

The electrode 2 of the present invention is composed of about 0.20% to 3.0% of a deoxidizing metal and the balance being steel. The deoxidizing metal may be in the form of a thin coating 19 on a steel core, as shown in FIG. 2 or a coating of finely divided particles bonded to a steel core, or the electrode itself may be an alloy of steel and the deoxidizing metal in the above proportions.

The deoxidizing metal is a metal having a strong affinity for oxygen and nitrogen and serves to convert any oxygen formed by the decomposition of carbon dioxide into a stable compound.

The deoxidizing metal also converts any iron oxide present in the molten weld metal to a more stable compound and thereby produces sounder welds. The metal may consists of aluminum, silicon, titanium, magnesium, zirconium, manganese or the like. It is desired that the amount of the metal be in excess of the amount usually found in a steel killed with that particular metal.

In order to obtain a uniform metal transfer from the electrode 2 to the workpiece a high current density is employed. Generally, the lower limit of the current density should be that minimum amount which will produce a uniform metal transfer and the upper limit of the current density should be that maximum amount which can be put into the electrode 2 without exploding the rod. More specifically, the current density should be at least 85,000 amperes per square inch, and for usual operations a current density of 100,000 to 200,000 amperes per square inch has proven very satisfactory.

In combination with the high current density, the speed of the electrode feed toward the workpiece should be in the range of 200 to 600 inches per minute. A feed of about 375 inches per minute has proven very satisfactory. The rate of electrode feed will normally result in travel of the welding head along the seam to be welded at about 8 to 150 inches per minute depending on the nature of the articles to be welded.

The rate of flow of carbon dioxide should be sufficient to continually purge the atmosphere at the region surrounding the arc. For most operations and electrode diameters the flow of carbon idoxide should be between 15 to 50 cubic feet per hour, and generally a rate of flow between 20 and 35 cubic feet per hour, is most satisfactory. This rate of flow of carbon dioxide is substantially less than the rate of flow of argon or helium which would be necessary with a corresponding electrode feed and welding amperage.

It has been found that the rate of flow of carbon dioxide should be maintained below a certain level on the nozzle opening, or the pressure regulator may freeze. If the rate of flow of the carbon dioxide is maintained below 50 cubic feet per hour this danger will ordinarily be eliminated.

A typical example of the use of the present invention as applied to the welding of an automotive control arm is as follows:

Stock composition—A. O. Smith Corp. spec. 1056:
　　Carbon _____ 0.18–0.25%.
　　Manganese _____ 0.30–0.60%.
　　Phosphorus _____ 0.04% maximum.
　　Sulphur _____ 0.05% maximum.
　　Copper _____ 0.20% maximum.
　　Iron _____ Balance.
Type of weld _____ Circular groove, filet weld.
Electrode size _____ 1/16 inch diameter.

Electrode composition:
　　Carbon _____ 0.17%.
　　Manganese _____ 1.10%.
　　Phosphorus _____ 0.012%.
　　Sulphur _____ 0.027%.
　　Silicon _____ 0.20%.
　　Iron _____ Balance.
Thickness of aluminum ____ 0.005 inch.
Speed of electrode feed ____ 210 inches/minute.
Speed of arc travel _____ 19.3 inches/minute.
Arc voltage _____ 30 volts.
Arc amperage _____ 300 amperes.
Current density _____ 100,000 amperes/square inch.
Rate of flow of $CO_2$ _____ 20 cubic feet/hour.

This procedure resulted in a sound uniform weld, free of porosity, and other physical defects.

While the above description is directed to the use of reverse polarity in the welding operation, it is contemplated that under certain conditions straight polarity can also be employed. For example, if it is desirable to have a smooth action with minimum spatter then reverse polarity should be used, but if spatter is not objectionable, then regular polarity can also be used.

Similarly, the use of direct current is not essential. In some instances it may be desirable to employ alternating current and the results obtainable with alternating current are acceptable.

The present invention provides a method obtaining more effective welds with the use of carbon dioxide gas as a shielding medium in arc welding. The properties of the welds are improved by using metal additions of a deoxidizing metal with a consumable steel electrode and employing a high rate of electrode feed and a high current density during the welding operation.

Various modes of carrying out the invention are contemplated as within the scope of the following claims particularly pointing out and distinctly claiming the subject matter which is regarded as the invention.

I claim:

1. A method of arc welding, comprising establishing an arc between a consumable steel electrode and a workpiece, said electrode consisting by weight of 0.20% to 3% of a strongly deoxidizing metal and the balance iron, feeding a gaseous medium consisting of substantially pure carbon dioxide to the arc at a rate of 15 to 50 cubic feet per hour to form a gaseous envelope around the arc and thereby exclude the surrounding atmosphere from the arc, feeding the electrode toward the workpiece at a speed of 200 to 600 inches per minute while maintaining a current density in said electrode of above 85,000 amperes per square inch, and the deoxidizing metal in the electrode converting any oxygen formed by the decomposition of the carbon dioxide into a stable compound nondeleterious to the weld formed by said method.

2. A method of arc welding comprising establishing an arc between a workpiece and a consumable steel electrode containing 0.20% to 3.0% of a deoxidizing metal selected from the group consisting of aluminum, silicon, titanium, zirconium and magnesium, feeding substantially pure carbon dioxide to the arc to form a gaseous envelope around the arc and thereby exclude the surrounding atmosphere from the arc, and feeding the electrode toward the workpiece at a speed of 200 to 600 inches per minute while maintaining a current density in the electrode of 100,000 to 200,000 amperes per square inch, said deoxidizing metal in the electrode converting any oxygen formed by the decomposition of the carbon dioxide into a stable compound.

References Cited in the file of this patent

UNITED STATES PATENTS

| | | |
|---|---|---|
| 2,504,867 | Muller _____ | Apr. 18, 1950 |
| 2,504,868 | Muller et al. _____ | Apr. 18, 1950 |
| 2,544,711 | Mikhalapov _____ | Mar. 13, 1951 |
| 2,824,948 | Willigen et al. _____ | Feb. 25, 1958 |

FOREIGN PATENTS

| | | |
|---|---|---|
| 736,241 | Great Britain _____ | Sept. 7, 1955 |
| 1,094,722 | France _____ | Dec. 8, 1954 |
| 1,102,303 | France _____ | May 4, 1955 |

UNITED STATES PATENT OFFICE
CERTIFICATE OF CORRECTION

Patent No. 3,035,153    May 15, 1962

John J. Chyle

It is hereby certified that error appears in the above numbered patent requiring correction and that the said Letters Patent should read as corrected below.

Column 3, line 38, for "idoxide" read -- dioxide --; line 72, for "Thickness of aluminum" read -- Thickness of aluminum coating --.

Signed and sealed this 20th day of November 1962.

(SEAL)
Attest:

ERNEST W. SWIDER
Attesting Officer

DAVID L. LADD
Commissioner of Patents